United States Patent [19]
Bricker

[11] 3,716,117
[45] Feb. 13, 1973

[54] CONSTANT TORQUE SPRING APPLIED BRAKE

[75] Inventor: Carl E. Bricker, Cuyahoga Falls, Ohio

[73] Assignee: The Goodyear Tire & Rubber Comapny, Akron, Ohio

[22] Filed: Aug. 21, 1970

[21] Appl. No.: 65,937

[52] U.S. Cl..................................188/167, 188/170
[51] Int. Cl. ...............................................B60t 13/04
[58] Field of Search ......188/106 F, 167, 170; 74/102

[56] References Cited

UNITED STATES PATENTS

| | | |
|---|---|---|
| 1,605,747 | 11/1926 | Magness...............................188/170 |
| 2,308,299 | 1/1943 | Page.....................................188/170 |
| 2,499,154 | 2/1950 | Nielson ................................188/170 |
| 2,946,408 | 7/1960 | Peras............................188/106 F X |
| 3,276,551 | 10/1966 | Buletti et al. .....................188/170 X |

Primary Examiner—Duane A. Reger
Attorney—F. W. Brunner, P. E. Milliken and Oldham and Oldham

[57] ABSTRACT

The invention discloses a piston screw brake which is applied by a spring mechanism. The spring consists of a long compression spring carried on a lever arm which pivots as the brake is applied. The spring extends the full length of the arm while the pivot point of the arm is shorter than the full length thereof.

3 Claims, 5 Drawing Figures

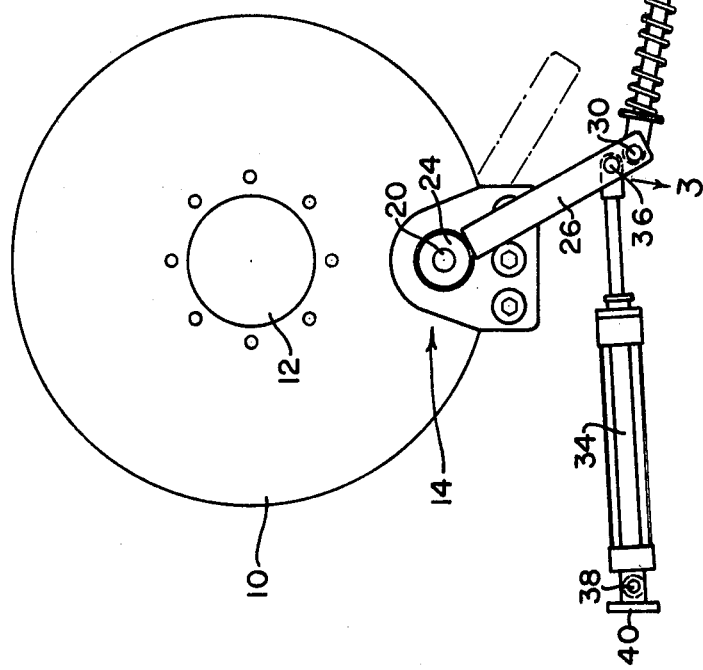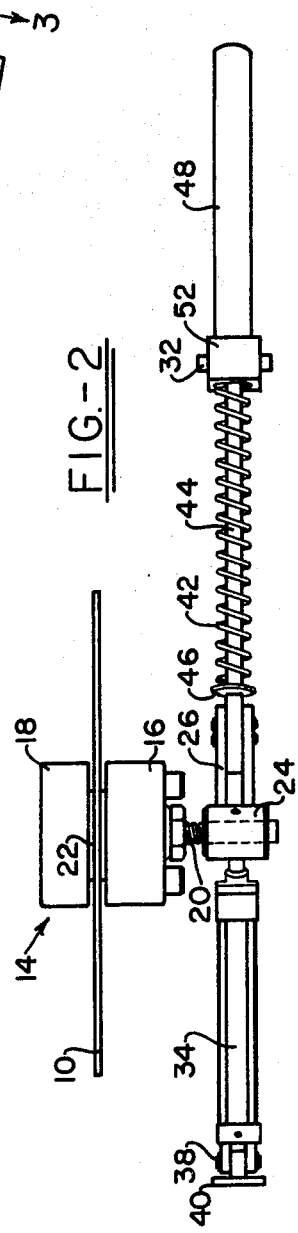

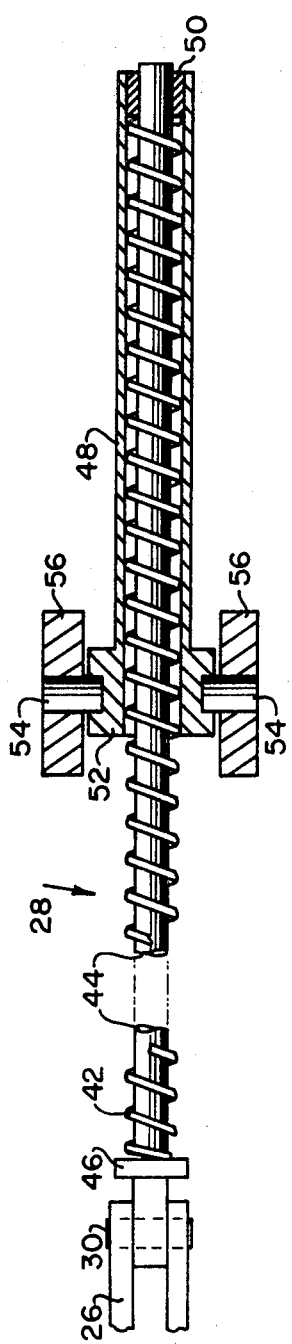
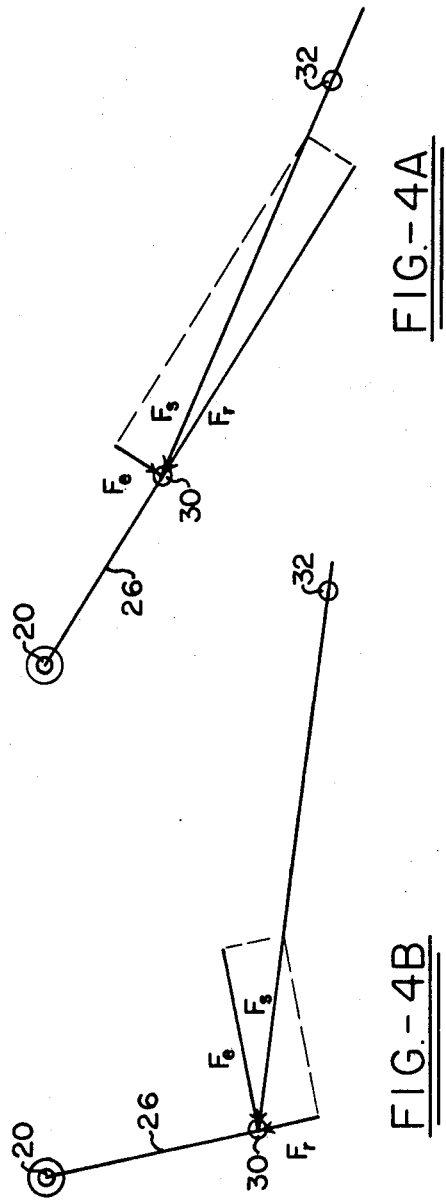

CONSTANT TORQUE SPRING APPLIED BRAKE

The invention relates to a spring applied brake and more particularly to such a brake which has a constant torque ability after limited lining wear without compensating for the lining wear by any mechanical adjustments.

In any brake arrangement the amount of movement of the brake actuating means between a fully released and an applied position gradually increases as the brake linings become worn since the brake linings must travel a greater distance to compensate for the wear of the linings. Heretofore, spring applied brakes have been adversely effected by lining wear since the increased amount of travel necessary to move the brake to the brake-on position results in a decrease in the force component which the spring is capable of applying to the brake actuating lever by the spring and, thus, a decrease in the torque. As a result, the amount of braking force applied decreases as lining wear increases.

It is the primary object of the present invention to provide a spring applied brake in which the amount of torque applied remains substantially constant over the entire range of lining wear.

It is also an object of the present invention to provide a spring applied brake in which constant torque ability is achieved without the need for any mechanical adjustments to compensate for lining wear.

A further object of the invention is a provision of a spring applied brake which achieves constant torque and which is of simple and reliable construction and operation.

The above and other objects of the invention which will become apparent in the following description are achieved by providing a spring actuating arrangement for the brake in which a compression spring is carried on a long rod which pivots as the brake is applied. The spring extends the entire length of the rod while the rod pivots about a point at less than the entire length of the rod. Since the amount of compression of the long spring in such a mounting arrangement varies only slightly from a fully released to a fully applied position, regardless of the amount of lining wear, the torque applied remains substantially constant.

Reference should be had to the following specification and the accompanying drawing wherein there is shown a preferred embodiment of the invention.

In the drawing:

FIG. 1 is a side elevational view of the spring applied brake of the present invention;

FIG. 2 is a top plan view of the brake mechanism of FIG. 1;

FIG. 3 is a sectional view taken along the line 3—3 of FIG. 1; and

FIG. 4a and 4b are schematic showings of the forces applied to the actuating lever of the piston screw by the compression spring with a new lining and with a worn lining, respectively.

In the drawings, a reference numeral 10 designates a brake disc which is mounted on and rotates with a shaft 12. For the proper operation of the brake the disc 10 must float laterally with respect to shaft 12 as is conventional and understood by those skilled in the art. A brake assembly designated generally by the reference numeral 14, and consisting of a pair of housings 16 and 18 which house pistons, not shown, and mounted on opposite sides of the disc 10. The piston of the housing 16 is forced toward and away from the disc 10 by a threaded shaft 20 which, when rotated in the clockwise direction (when viewed as in FIG. 1) forces the piston inwardly to bring the brake pads 22 into contact with opposite faces of the disc 10. The shaft 20 is threadably received into a bushing 21. The bushing 21 is threadably received by the piston housing 16. The threads between the housing 16 and bushing 21 are fine while the threads between shaft 20 and bushing 21 are coarse. Hence, adjustment to compensate for wear of the brake pads 22 is easily accomplished by turning the bushing 21 a short arc which causes a large adjustment in the relative spaced position between shaft 20 and housing 16. The shaft 20 is keyed to a hub 24 from which extends an arm 26 for rotating the hub 24 and shaft 20. The outer end of the arm is connected to a spring mechanism designated generally by the numeral 28 which is pivotally connected at one end 30 to the arm 26 and at a second fixed point 32. As will be seen from FIG. 1, the distance between the pivot points 30 and 32 is at a minimum when the brake is in its off position and increases as the arm 26 moves clockwise to bring the brake into an applied position. The brake is released by means of a hydraulic cylinder 34 pivotally connected at its operative end 36 to the arm 26 and at its opposite end 38 to a bracket 40 mounted on a suitable support. The spring mechanism 28 and hydraulic cylinder 34 are mounted so that they oppose one another.

The spring applying mechanism 28 is shown in detail in FIG. 3. The mechanism consists essentially of a long compression coil spring 42 extending along the length of a rod 44 which is pivotally connected at one end 30 to the lower end of the arm 26. One end of the coil spring 42 is held against a collar 46 rigidly secured to the rod 44. The rod 44 and coil spring 42 extend through a sleeve 48 with the rod 44 sliding through a bushing 50 secured to the rear ends of the tube 48. The bushing 50 also serves as a rear stop for the compression spring 42. The forward end of the tube 48 carries an enlarged collar 52 which is provided with a pair of pins 54 on opposite sides for pivotally mounting the tube 48 in a pair of brackets 56 secured to a suitable rigid support. The axis of the pin 54 corresponds to the pivotal axis 32 of the spring brake applying mechanism 28.

When the brake is in its fully released position, as shown in dotted outline in FIG. 1, the axis of the arm 26 and that of the rod 44 are nearly coincident. In this position the distance between the end of the arm 26 and the pivot point 32 of the spring carrier assembly 28 is at a minimum and the spring 42 is fully compressed. The arm 26 is held in this position by the cylinder 34. When the cylinder 34 is released, the force exerted by the spring 42 rotates the arm 26 in a clockwise direction, moving the brake pads 20 into contact with the disc 10. As will be seen from FIGS. 4a and 4b, the force $F_s$ exerted on the free end of the arm 26 by the spring 42 may be considered to be two orthogonal component forces. The first component force $F_r$ acts radially along the arm 26 and thus does not contribute to the braking action. The second component force $F_e$ acts at right angles to the arm 26 and thus is the effective force. The arm 26 will continue to rotate until the torque produced by the force $F_e$ over the arm 26 is balanced by the torque produced by the clamping force of the brake pads 22 through the piston screw 20. As the pads 22 become worn, further movement of the pads 22 and associated pistons are necessary to achieve braking action. Consequently, further rotation of the arm 26 is also necessary.

As will be noted from FIGS. 4a and 4b, the angle between the arm 26 and the axis of the spring 42 decreases to approach a right angle with increased rotation of the arm while the distance between the end of the arm and the spring carrier pivot point 32 increases. Since the angle is decreasing, the effective force component $F_e$ becomes a greater fraction of the total force $F_s$ exerted by the spring 42. At the same time, the increasing length results in a decreasing of the total force $F_s$. The change in length of the spring 42 is small, however, due to the fact that the spring extends beyond the pivot point 32. The effective force $F_e$ remains substantially constant during the life of the brake pads 22 since the decrease in total force $F_s$ exerted by the spring 42 is slight, due to the length of the spring, and is offset by the increase in the ratio of effective force $F_e$ to total force $F_s$, due to the decrease of the angle between the arm 26 and the spring carrier 28.

While, in accordance with the patent statutes, only the best known embodiment of the invention has been described herein, it will be understood that various changes and additions may be made to the claimed structure without departing from the spirit of the invention. Reference should therefore be had to the appended claims in determining the true scope of the invention.

What is claimed is:

1. Actuating mechanism for a screw piston brake assembly, comprising:
    a lever arm rigidly secured to the piston screw of the brake assembly;
    first force applying means including an elongated coil spring acting on the free end of the lever arm to rotate the arm and the piston screw to the brake applied position and a carrier for the coil spring which engages the end of the spring remote from the lever arm, the force applying means being pivotally connected at one end to the free end of the lever arm and at a point intermediate its ends to a fixed support; and
    second force applying means controllably acting on the free end of the lever arm in opposition to the first means to rotate the arm and the piston screw to the brake released position.

2. The actuating mechanism according to claim 1 wherein the first force applying means comprises a tubular member pivotally connected at its first end to a fixed support, an elongated rod extending axially through the tubular member and projecting from the first end thereof, the projecting end of the rod being pivotally connected to the free end of the lever arm, and a coil compression spring surrounding the rod and extending substantially the entire length thereof, one end of the spring acting on the lever arm and the other end of the spring acting on the second end of the tubular member.

3. The actuating mechanism according to claim 2 wherein the spring provides a substantially constant force at various percentages of compression.

* * * * *